United States Patent
Seibt

(10) Patent No.: US 9,506,696 B2
(45) Date of Patent: Nov. 29, 2016

(54) HAND TREATMENT DEVICE

(71) Applicant: Airbus Operations GmbH, Hamburg (DE)

(72) Inventor: Christian Seibt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 108 days.

(21) Appl. No.: 14/468,628

(22) Filed: Aug. 26, 2014

(65) Prior Publication Data

US 2015/0059085 A1   Mar. 5, 2015

(30) Foreign Application Priority Data

Aug. 30, 2013 (EP) .................. 13 182 464

(51) Int. Cl.
| | |
|---|---|
| F26B 21/04 | (2006.01) |
| F26B 21/00 | (2006.01) |
| A47K 10/48 | (2006.01) |
| B64D 11/02 | (2006.01) |
| E03C 1/14 | (2006.01) |
| F26B 21/12 | (2006.01) |

(52) U.S. Cl.
CPC ............. *F26B 21/004* (2013.01); *A47K 10/48* (2013.01); *B64D 11/02* (2013.01); *E03C 1/14* (2013.01); *F26B 21/12* (2013.01); *A47K 2210/00* (2013.01); *Y02T 50/46* (2013.01)

(58) Field of Classification Search
CPC ........ F26B 19/00; F26B 21/00; F26B 21/04; F26B 21/004; F26B 21/12; E03C 1/00; E03C 1/14; A47K 10/00; A47K 10/24
USPC ..... 34/60, 505, 201; 4/625, 638; 134/115 G, 134/201
See application file for complete search history.

(56) References Cited

U.S. PATENT DOCUMENTS

| | | | | |
|---|---|---|---|---|
| 4,144,596 A | * | 3/1979 | MacFarlane ........... | A47K 10/48 392/381 |
| 5,245,711 A | * | 9/1993 | Oldfelt .................... | B64D 11/02 4/431 |
| 5,992,430 A | * | 11/1999 | Chardack ............... | A47K 10/46 134/102.3 |
| 6,128,826 A | * | 10/2000 | Robinson ............. | A47K 10/485 34/90 |
| 8,602,353 B2 | | 12/2013 | Lindauer et al. | |
| 9,139,302 B2 | * | 9/2015 | Dehn ..................... | B64D 11/02 |

(Continued)

FOREIGN PATENT DOCUMENTS

| | | | | |
|---|---|---|---|---|
| DE | 102006042300 A1 | * | 3/2008 | ............. B60R 15/02 |
| DE | 2487110 A2 | * | 8/2012 | ............. B64D 11/02 |

(Continued)

OTHER PUBLICATIONS

European Patent Office, Extended European Search Report for European Patent Application No. 13182464 mailed Oct. 18, 2013.

*Primary Examiner* — Stephen M Gravini
(74) *Attorney, Agent, or Firm* — Lorenz & Kopf LLP

(57) ABSTRACT

A hand treatment device is provided for drying a user's hands with an airflow. The hand treatment device comprises a hand treatment chamber comprising a hand insertion section and an outflow sink for purging fluid carried by the airflow from the user's hands to the outflow sink. Therein, the airflow is generated by applying a negative pressure to the outflow sink, such that air is sucked from an environment of the hand treatment device through the hand insertion section into the outflow sink.

17 Claims, 7 Drawing Sheets

(56) References Cited

U.S. PATENT DOCUMENTS

| | | | |
|---|---|---|---|
| 9,192,686 B2* | 11/2015 | Graydon | A47K 10/48 |
| 2008/0127411 A1* | 6/2008 | Hoffjann | B60R 15/02 |
| | | | 4/664 |
| 2011/0271441 A1* | 11/2011 | Bayley | A47K 10/48 |
| | | | 4/638 |
| 2012/0210509 A1 | 8/2012 | Dehn et al. | |
| 2012/0273614 A1 | 11/2012 | Ehlers et al. | |
| 2015/0013063 A1* | 1/2015 | Boodaghians | B61D 35/007 |
| | | | 4/663 |
| 2015/0059085 A1* | 3/2015 | Seibt | A47K 10/48 |
| | | | 4/638 |

FOREIGN PATENT DOCUMENTS

| | | | | |
|---|---|---|---|---|
| DE | 102011010913 A1 * | 8/2012 | | B64D 11/02 |
| DE | 2842870 A1 * | 3/2015 | | A47K 10/48 |
| IE | WO 2012076521 A1 * | 6/2012 | | A47K 10/48 |
| JP | H0662979 A | 3/1994 | | |
| KR | WO 03024291 A1 * | 3/2003 | | A47K 10/48 |
| WO | 03024291 A1 | 3/2003 | | |

* cited by examiner

HAND TREATMENT DEVICE

CROSS-REFERENCE TO RELATED APPLICATION

This application claims priority to European Patent Application No. 13 182 464.1 filed Aug. 30, 2013, which is incorporated herein by reference in its entirety.

TECHNICAL FIELD

The technical field relates to devices in the field of hand treatment, amongst others for a means of transport for instance an aircraft cabin comprising a lavatory module or a galley. In particular, the technical field relates to a hand treatment device for an aircraft, a washstand with a hand treatment device, a lavatory module and an aircraft with a hand treatment device or a washstand.

BACKGROUND

In cabins of aircrafts, and particular in lavatory modules or galleys installed therein, washbasins are provided to passengers and aircrews for washing their hands. In order to dry hands usually paper tissues are used, which are taken from a dispenser mounted near the washbasin. Used paper tissues are then collected and disposed in a bin.

Thus, both clean and used paper tissues need to be stored. Moreover, it has to be ensured that a sufficient number of paper tissues are available at all times. For this purpose an adequate storage is required and onboard dispensers providing the paper tissues have to be refilled regularly. Herewith, increased space requirements, increased weight and additional costs may be related.

DE 10 2009 018 690 A1 and WO 2010/121862 A4 describe lavatory modules for an aircraft. DE 10 2011 010 913 A1 and EP 2487110 A2 describe a hand drying device and a washstand for an aircraft. DE 10 2009 021 970 A1 describes an autonomous water module for an aircraft, which module comprises a washbasin.

In addition, other objects, desirable features and characteristics will become apparent from the subsequent summary and detailed description, and the appended claims, taken in conjunction with the accompanying drawings and this background.

SUMMARY

According to one of various aspects of the present disclosure, a hand treatment device is provided, which hand treatment device is adapted for drying a user's hands with an airflow. The term "airflow" may be understood as a stream or flow of air flowing about and/or along the user's hands. In order to efficiently dry the user's hands, the stream of air may be powerful enough to drag and/or carry fluid from the user's hands.

According to an embodiment of the present disclosure, the hand treatment device comprises a hand treatment chamber. The hand treatment chamber comprises a hand insertion section, into which the user may insert his hands. Thus, the hand insertion section may accommodate the user's hands during a hand treatment, such as e.g. a hand cleaning or drying procedure. The hand treatment chamber further comprises an outflow sink, which is adapted for purging fluid carried by the airflow from the user's hands to the outflow sink. In other words, the airflow may flow along the user's hands, drag fluid, such as for instance water, from the user's hands and may then be conducted through the outflow sink.

According to an embodiment of the present disclosure, the airflow is generated by applying a negative pressure to the outflow sink, such that air is sucked from an environment of the hand treatment device through the hand insertion section into the outflow sink.

The term "negative pressure" may be understood as an underpressure or negative pressure with respect to e.g. a cabin air pressure in an aircraft, i.e. a pressure of air in a cabin of the aircraft, or a pressure of an air surrounding or being present in the environment of the hand treatment device. By applying such negative relative pressure, i.e. a negative pressure relative to the pressure of the air in the environment of the hand treatment device, a gradient, difference and decline in pressure may be generated, wherein the pressure of air drops from a pressure level of the air in the environment of the hand treatment device to a pressure level applied to the outflow sink. This pressure gradient, difference and decline may result in a suction effect, which may lead to a flow or stream of air from the environment of the hand treatment device through the hand insertion section to the outflow sink, thereby generating the airflow for drying the user's hands.

For applying the negative pressure to the outflow sink, the hand treatment device may also comprise a device, which may generate the negative pressure, such as e.g. a vacuum generating device. In other words, the hand treatment device may comprise a source of negative pressure.

By sucking the air from the environment of the hand treatment device, a hygiene of a procedure or process of drying hands may be optimized, because air may for instance be sucked from air layers well above e.g. a floor of a lavatory. Such air layers located well above the floor may not be contaminated and may thus be considered non-critical in terms of hygiene.

The hand treatment chamber may for instance be a chamber comprising a chassis made of a low-cost and low-weight but robust material, such as e.g. plastic material or Aluminum, and the chassis may for instance encompass or surround a cavity, which may constitute an interior of the hand treatment chamber. The hand treatment chamber may comprise at least one opening on one side, which may serve as hand insertion section, and the outflow sink on a further side. The outflow sink may be designed for example as cone-like section of the hand treatment chamber or it may be designed as separate part mounted to the hand treatment chamber. Correspondingly, the hand treatment chamber, the hand insertion section, and the outflow sink may be formed as one piece or as multiple parts mounted together.

The hand treatment chamber may further comprise an antimicrobial and/or anti-adhesive surface, which may prevent pathogenic organisms, such as e.g. bacteria and/or pathogenic germs, from being present on the surface of the hand treatment chamber, and which may provide a self-cleaning and/or "easy to clean" surface, in particular in the interior of the hand treatment chamber. The hand treatment chamber may for this purpose be manufactured from a composite material providing such antimicrobial and/or anti-adhesive surface structure and/or an antimicrobial and/or anti-adhesive coating and/or layer may be applied on the surface of the hand treatment chamber. In other words, the hand treatment chamber may comprise a layered structure with an antimicrobial and/or anti-adhesive surface layer.

According to an embodiment of the present disclosure, the hand treatment device comprises a first sensor, which is adapted for detecting a presence of the user's hands in the hand insertion section. The first sensor may be arranged on and/or in an inner wall of the hand treatment chamber, for example, on an inner wall of the hand insertion section. The inner wall of the hand treatment chamber may be directed towards a center of the hand treatment chamber, i.e. it may face away from the environment or exterior of the hand treatment device. The first sensor may for example comprise a motion sensor, an infrared sensor, an optical sensor, a laser, a radio frequency sensor or any other detection sensor. The hand treatment device further comprises a second sensor, which is adapted for detecting a presence of the user's hands in the hand treatment chamber. Similarly to the first sensor, the second sensor may be arranged on and/or in the inner wall of the hand treatment chamber between the first sensor and the outflow sink. Also the second sensor may for example comprise a motion sensor, an infrared sensor, an optical sensor, a laser, a radio frequency sensor or any other detection sensor. When the user inserts his hands into the hand insertion section, the first sensor can detect the presence of the hands and a first signal can be generated by the first sensor. In accordance with the (first) signal of the first sensor the airflow for drying the user's hands can be generated. In case the user inserts his hands further into the hand treatment chamber towards the outflow sink, a second signal can be generated by the second sensor. In accordance with the (second) signal of the second sensor, the airflow can be stopped.

Alternatively and/or additionally to the prescribed sensors, the hand treatment device can comprise a switch device which may be adapted for turning the hand treatment device on and/or off, i.e. which can be adapted for generating and/or stopping the airflow by for example opening or closing a path to a source of negative pressure applied to the outflow sink. The switch device may for instance be arranged on the hand treatment device and it may be actuated manually by the user or it may be actuated in a contactless manner. The switch device may for this purpose comprise a regular switch or a sensor, such as e.g. a motion sensor or a pressure sensor. Apart from that, the switch device may be arranged near the hand treatment device, for instance in a floor or a wall. The switch device may also comprise a connection to a separate device, such as for instance a toilet flush or any other device. This may allow to turn the hand treatment device on and/or off in accordance with the separate device by e.g. activating the separate device.

The first sensor can therefore serve to start the hand treatment device and generate the airflow in a contactless manner, i.e. the user does not necessarily have to touch the hand treatment device. This may increase the hygiene of the hand drying process. On the other hand the second sensor may serve as a safety measure, for instance as a protection against suction effects.

All sensors and/or the switch device may be multiply present on the hand treatment device for redundancy and safety reasons.

According to an embodiment of the present disclosure, the hand treatment device comprises a fluid supply device, which is adapted for providing water and/or disinfectant, wherein the fluid supply device comprises a spray device, which is adapted for supplying water and/or disinfectant into the hand insertion section, such that the user's hands and/or the hand treatment chamber are cleaned and/or disinfected.

At least a part of the spray device may be arranged e.g. on and/or in the inner wall of the hand treatment chamber close to or in the hand insertion section for supplying water and/or disinfectant into the hand insertion section. Apart from that, also other fluids or liquids, such as e.g. a soap, a cleaning agent, or a purifier may be supplied into the hand insertion section by the spray device. Also an oil, a cream, or any other cosmetic care product may be supplied.

It is noted that "supplied into the hand insertion section" can mean sprayed, sprinkled, sputtered, injected, and/or dispersed into the hand insertion section.

The spray device can comprise for example at least one nozzle, a nozzle arrangement, an injector, a bushing, or a perforated hose. Via the spray device, the fluid supply device can for instance inject water into the hand insertion section and onto the user's hands, which may serve for washing the user's hands. The fluid supply system may further inject disinfectant and/or cleaning agent into the hand insertion section, which disinfectant and/or cleaning agent can provide an agent for a disinfection and/or cleaning of the user's hands. Water, disinfectant and cleaning agent may be injected prior or during a hand drying and/or cleaning procedure, i.e. while the airflow is generated, for optimizing the procedure in terms of hygiene. Apart from that, water and/or disinfectant and/or cleaning agent can be injected into the hand treatment chamber after drying a user's hands in order to clean and/or disinfect the hand treatment chamber. This may further increase the overall hygiene of the hand treatment device. Moreover, also a cosmetic care product may be injected into the hand insertion section and onto the user's hands, e.g. for nourishing a skin of the hands. Also after injecting the cosmetic care product, water and/or disinfectant and/or cleaning agent can be injected into the hand treatment chamber in order to clean and/or disinfect the hand treatment chamber.

This may mean that the hand treatment device may be a multifunctional tool for washing, cleaning, disinfecting, drying, and nourishing the user's hands, wherein all the liquids, fluids and agents supplied to the hand treatment chamber can be purged through the outflow sink with the airflow. Therein, the airflow, a strength of the airflow, and/or a speed of the airflow can be controlled and/or regulated by the hand treatment device during or after supplying any of the prescribed liquids or fluids into the hand treatment chamber. For instance it may be necessary to increase the strength and/or speed of the airflow after supplying a highly viscous fluid, such as e.g. a cream or an oil in order to efficiently purge the respective fluid. On the other hand, the strength and/or speed of the airflow may be reduced after supplying a fluid of low viscosity, such as e.g. water or disinfectant.

For supplying different liquids or fluids, such as e.g. water, disinfectant, soap and cream, the fluid supply device can comprise various storages for storing the respective fluids. Apart from that, the fluid supply device can comprise various supply channels or a single channel for providing the fluids to the spray device and for supplying them into the hand treatment chamber. Moreover, the fluid supply device can comprise at least one actuator, such as e.g. a valve, for supplying the various fluids by for instance opening a path to the respective storage.

Apart from the prescribed disinfection functionality of the hand treatment device using disinfectant and/or an agent, the hand treatment device can also comprise an UV-C device with a UV-C lamp for analyzing the disinfection of the user's hands. This may mean that the hand treatment device may check and analyze automatically whether the user's hands are sufficiently disinfected after applying disinfectant and/or after drying the user's hands. In case the user's hands are not sufficiently disinfected, the hand treatment device can automatically supply further disinfectant to the user's hands. Apart from that, the UV-C device may also provide an additional and/or alternative way for disinfecting the user's hands with ultraviolet light. The UV-C device may also provide a tool for the user to manually check whether hand disinfection may be required, and the user may manually actuate the UV-C device.

For the prescribed analysis of a successful and sufficient hand disinfection, as well as for the additional and/or alternative way of disinfection using ultraviolet light, the UV-C lamp can be arranged on an inner wall of the hand treatment chamber, such that only the user's hands may be exposed to ultraviolet light during the hand treatment procedure and no or only a harmless amount of UV-light may escape from the hand treatment chamber.

The prescribed cleaning and/or disinfection functionality of the hand treatment device may also be an interesting feature for health reasons, such as e.g. pandemic and/or epidemic, situations, because both crew members and passengers may be able to efficiently and safely clean and disinfect their hands. Apart from that, by supplying and injecting liquids or fluids into the hand treatment chamber, none or almost no liquid or fluid may swirl in the environment of the hand treatment device, which may be advantageous in terms of hygiene. Also purging the fluids and liquids as well as the air, which may be contaminated and which may carry the fluids and liquids, through the outflow sink may significantly increase the overall hygiene of the hand treatment device. This may be particularly advantageous for instance for allergic persons and allergy sufferers.

Moreover, the fluid supply system can be connected to the switch device and/or to the first and/or second sensor and water and/or disinfectant or any other fluid or liquid may be injected automatically in accordance with a signal of any of the sensors and/or the switch device, thereby providing a contactless usage, which may further increase the hygiene.

According to an embodiment of the present disclosure, the hand treatment device comprises at least one air inlet opening, which is arranged on the inner wall of the hand treatment chamber, which at least one air inlet opening is adapted for providing at least one further airflow, such that the user's hands are pushed by the at least one further airflow towards a center plane of the hand treatment chamber. The air inlet opening may for example be or comprise a louver arranged on the inner wall of the hand treatment chamber, e.g. on the inner wall of the hand insertion section.

By applying the negative pressure to the outflow sink, air may be sucked through the air inlet opening. This may result in a further airflow, which may be directed laterally to the airflow for drying the user's hands, i.e. the further airflow may be directed towards the center plane of the hand treatment chamber, which center plane may be defined by an insertion direction of the user's hands. Correspondingly, the further airflow may push and/or guide the user's hands in the hand insertion section towards the center plane of the hand treatment chamber. This may prevent the user's hands to touch any interior wall of the hand treatment device and thus may further increase the hygiene of the hand cleaning and drying procedure.

Another one of various aspects of the present disclosure relates to a method for cleaning and drying a user's hands with a hand treatment device as described in the above and in the following. The method comprises inserting the user's hands into the hand insertion section. Optionally, water and/or cleaning agent, such as e.g. soap, can be supplied into the hand insertion section with the fluid supply device and the spray device. The method further comprises generating the airflow for drying the user's hands by applying a source of negative pressure to the outflow sink of the hand treatment device, such that water and/or cleaning agent can be purged from the user's hands and/or from the hand treatment chamber into the outflow sink. Optionally, water may be supplied again for removing remaining cleaning agent from the user's hands. Optionally, disinfectant may be supplied into the hand treatment chamber. The airflow may optionally be generated again in order to purge excessive disinfectant through the outflow sink and to dry the user's hands. Optionally, a cosmetic care product, such as e.g. an oil or a cream, may be supplied into the hand insertion section. After the user's hands are removed from the hand treatment chamber, the hand treatment chamber may optionally be cleaned and/or disinfected by again supplying water and/or cleaning agent and/or disinfectant into the hand treatment chamber, and the airflow may be generated again in order to purge remaining water, cleaning agent and/or disinfectant.

The hand treatment device as described in the above and in the following may for example be mounted and used in a hospital, in a nursing home, a retirement home, a kindergarten or basically any other place. The hand treatment device may also be mounted and used in a means of transport, such as e.g. an aircraft, a train, or a bus.

Another one of various aspects of the present disclosure relates to a washstand, which washstand comprises a washbasin and a hand treatment device as described in the above and in the following.

The washbasin can also be a part of the hand treatment device. This may mean that for instance the hand treatment chamber may serve as washbasin. Also a water faucet and/or a soap dispenser may be arranged and mounted above the hand insertion section. In other words, the hand treatment device and/or the washstand may further comprise a water faucet and/or a soap dispenser, which may be arranged above the hand insertion section, such that water and/or soap may be supplied into the hand treatment chamber via the hand insertion section.

The washstand may for instance be an autonomous washing module for an aircraft in the sense of the DE 10 2009 021 970 A1 or it may be a washstand mounted in the cabin, such as for instance in a lavatory, a galley, an aisle, an entrance, a cockpit, a first aid station, or any other place in the cabin. Moreover, the washstand may be mounted and used in any other means of transport, such as e.g. a train, or a bus.

The washstand may also be a module for a lavatory, a galley, an aisle, a cockpit, or a first aid station of an aircraft.

Apart from that, the washstand may also be mounted and used for instance in a hospital, in a nursing home, a retirement home, a kindergarten or basically any other place.

According to an embodiment of the present disclosure, the hand treatment device is arranged at a front side of the washbasin or below the washbasin of the washstand.

In other words the hand treatment device may be mounted near the washbasin within an action radius of the user. This may mean that the user may not have to move away (i.e. walk away) from the washbasin in order to dry his hands after washing them in the washbasin.

The "front side" of the washbasin may be defined or given as the side of the washbasin facing the user, when the user washes his hands or uses the washbasin. In other words the front side of the washbasin may be parallel to a front side of the user, while he uses the washbasin, and perpendicular to a floor of the aircraft. On the other hand, "below" the washbasin may mean arranged between the floor and a tap or faucet of the washbasin.

An arrangement of the hand treatment device at a front side or below the washbasin may for example prevent water droplets to fall from the user's hands to the floor or swirl around in an environment of the washstand. This in turn may increase a hygiene of the washstand.

According to an embodiment of the present disclosure, the hand treatment device is pivotably mounted on the washstand for being pivoted from a storage position into a use position, and the hand treatment device is adapted for automatically pivoting from the storage position into the use position, when a water supply of the washbasin is activated.

In this context, "pivotably mounted" may for example mean mounted with a hinge on the washstand. The storage position of the hand treatment device may for instance be a retracted or folded state of the hand treatment device, in which the hand treatment chamber may not be accessible for the user from an outside of the washstand. The hand treatment device may for example be seamlessly integrated in the washstand in the storage position. On the other hand, the use position may for instance be a state, in which the hand treatment device, more precisely the hand treatment chamber, is expanded or swung out, such that the hand treatment chamber is accessible for the user.

In order to allow for a contactless usage, the hand treatment device may swing or pop out automatically when the water supply of the washbasin is activated. This may further increase the hygiene of the hand cleaning and drying procedure and the washstand itself.

According to an embodiment of the present disclosure, the washstand is configured for a contactless usage. This may mean that the user of the washstand may not have to touch any armatures, control instruments, or buttons for conducting a washing or cleaning procedure of his hands. It may also be possible that an automatic soap dispenser is arranged on the washstand, which may automatically provide soap when the user puts his hand under the dispenser. The soap dispenser may provide soap above the washbasin, such that excessive soap may fall into the washbasin.

Another one of various aspects of the present disclosure relates to a lavatory module for a means of transport, such as e.g. an aircraft, a train, or a bus. The lavatory module comprises a hand treatment device as described in the above and in the following and/or a washstand as described in the above and in the following.

The hand treatment device and/or the washstand may for example be connected to a toilet, such that a combined toilet-washstand module may be provided.

Another one of various aspects of the present disclosure relates to an aircraft comprising a hand treatment device as described in the above and in the following and/or a washstand as described in the above and in the following.

According to an embodiment of the present disclosure, the aircraft further comprises an airflow generating device, which device is adapted for generating the airflow to dry the user's hands. The airflow generating device comprises a valve, which is adapted for connecting a source of negative pressure to the outflow sink. The negative pressure is applied by opening the valve, such that air is sucked from the environment of the hand treatment device through the hand insertion section into the outflow sink.

The valve may for instance be or comprise a purge valve, which may for example be magnetically, mechanically, or electrically controlled.

Also in this context, the term "negative pressure" may be understood as an underpressure or negative pressure with respect to e.g. a cabin air pressure, i.e. a pressure of air in a cabin, or a pressure of an air surrounding or being present in the environment of the hand treatment device. By applying such negative relative pressure, i.e. a negative pressure relative to the pressure of the air in the environment of the hand treatment device, a gradient, difference and decline in pressure may be generated, wherein the pressure of air drops from a pressure level of the air in the environment of the hand treatment device to a pressure level applied to the outflow sink. This pressure gradient, difference and decline may result in a suction effect, which may lead to a flow or stream of air from the environment of the hand treatment device through the hand insertion section to the outflow sink, thereby generating the airflow for drying the user's hands.

According to an embodiment of the present disclosure, the source of negative pressure is a vacuum toilet system of the aircraft or an outside environment of the aircraft.

The vacuum toilet system can be a part of or can be connected to a toilet assembly or galley waste disposal unit of the aircraft. The vacuum toilet system may be adapted for purging e.g. excrements of passengers in the aircraft by applying a negative pressure or a low-pressure with respect to the cabin air pressure to a toilet bowl of the aircraft. Such negative pressure or low-pressure may be applied to the hand treatment device for generating the airflow for drying the user's hands. Since basically an maximum amount in the order of about 100 liters per second may be purged with such vacuum toilet system, the negative pressure or low-pressure of the vacuum toilet system may be further controlled and/or regulated by for example the purge valve or a further valve of the airflow generating device.

Using the vacuum toilet system for generating the airflow for drying the user's hands may be advantageous concerning various aspects. For instance the hand treatment device may be designed in a compact and low-weight manner, because an already existing system may be used to generate the airflow. Correspondingly, there may be no need for further equipment for generating the airflow, such as e.g. a compressor. This may save space and may significantly reduce a weight of the hand treatment device, the washstand, the lavatory module, and the aircraft. In turn this may save fuel and reduce costs related to a flight. For example the weight of the hand treatment device may be expected to be reduced to about half of the weight of a hand treatment device, which uses a compressor for generating the airflow.

Moreover, electrical power may be saved by generating the airflow with the vacuum toilet system instead of e.g. a compressor.

Apart from that, by using the vacuum toilet system for generating the airflow and by purging and/or sucking this airflow, which may carry water from the user's hands, into the vacuum toilet system, the overall hygiene of the hand washing/drying procedure may be increased, because no contaminated paper tissues or water droplets may remain e.g. in the lavatory module or the galley, but may be disposed in a disposal unit of the toilet assembly or vacuum toilet system or in the galley waste disposal unit.

Apart from the vacuum toilet system, also an outside environment of the aircraft may serve as source of negative pressure for generating the airflow in the hand treatment device. In this context "environment of the aircraft" may mean the Earth's atmosphere. At a certain altitude above sea level, an atmospheric pressure of the Earth's atmosphere may be sufficiently low compared to the cabin air pressure, such that the pressure difference between atmosphere and cabin air may be used to generate the airflow in the hand treatment device. Correspondingly, when the aircraft may have reached a sufficiently high altitude above sea level, the hand treatment device may be operated using the aircraft's environment as source of negative pressure.

For this purpose, e.g. a low-pressure line connecting the environment of the aircraft and the outflow sink may be used to generate the airflow. This may be related to the same or similar advantageous in terms of weight, space, cost, and power consumption reduction as when using the vacuum toilet system.

According to an embodiment of the present disclosure, the hand treatment device is connected to a toilet assembly of the aircraft, wherein a flush of the toilet assembly is activated when the hand treatment device is activated.

This may allow reducing noise related to the flush of a toilet, because both the toilet flush and the hand treatment device may be operated simultaneously. Correspondingly a time a user of the toilet may generate noise may be reduced and other passengers or crew members may be disturbed during a shorter time period.

Another one of various aspects of the present disclosure relates to a use of a vacuum toilet system of a means of transport for generating an airflow in a hand treatment device.

Potential means of transport may for example be a train, a plane, a bus or any other means of transport being equipped with a vacuum toilet system or a vacuum system alike.

If technically possible but not explicitly mentioned, also combinations of embodiments of the present disclosure described in the above and in the following may be embodiments of the hand treatment device, the washstand, the lavatory module, or the aircraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
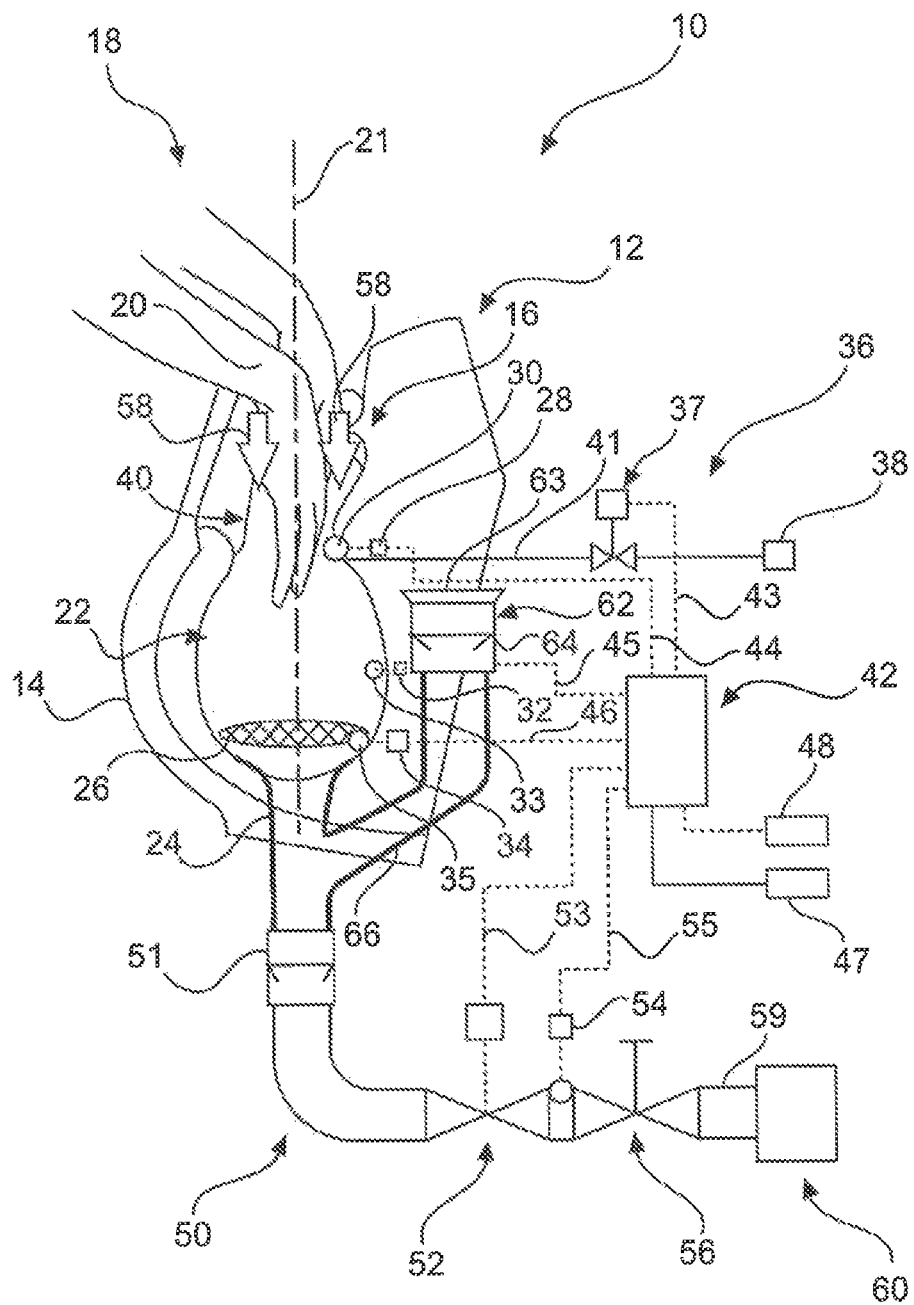
FIG. 1 schematically shows a cross-sectional view of a hand treatment device according to an embodiment of the present disclosure.

FIG. 1 schematically shows a cross-sectional view of a hand treatment device 10.

The hand treatment device 10 comprises a hand treatment chamber 12. The hand treatment chamber 12 comprises a chassis 14 with a hand insertion section 16, in which a user 18 may insert his hands 20 for drying them. The hand treatment chamber 12 further comprises a sink 22, which may be a cavity in the hand treatment chamber 12 and which can be closed at least on two sides parallel to a center plane 21 of the hand treatment chamber 12.

The hand treatment chamber 12, and in particular the hand insertion section 16 can comprise hygienic antimicrobial and/or "easy to clean" coatings applied on the surfaces.

On a side opposing the hand insertion section 16, the hand treatment chamber 12 comprises an outflow sink 24. The outflow sink 24 is covered by a safety device 26 to prevent the user 18 to insert his hands 20 too close to the outflow sink 24 into the hand treatment chamber 12. The safety device 26 may for instance be or comprise a mesh, a grating, a membrane or any other suitable barrier which allows air to flow through while preventing the user's 18 hands 20 to enter and/or cover the outflow sink 24. The safety device 26 thus separates the sink 22 and the outflow sink 24 in a large scale and prevents the user 18 to cover the outflow sink 24 with his hands 20.

A first sensor 28 is arranged in an inner wall of the hand insertion section 16, which first sensor 28 is adapted for detecting a presence of the user's 18 hands 20 in the hand insertion section 16. The first sensor 28 may for instance be a motion sensor, an infrared sensor, a radio-frequency sensor, an optical sensor or any other motion sensor. The first sensor 28 can comprise a first sensor head 30 arranged on the inner wall of the hand insertion section 16, which first sensor head 30 can provide a signal when user 18 inserts his hands 20 into the hand insertion section 16.

Moreover, a second sensor 32 is arranged in the inner wall of the hand treatment chamber 12 between the outflow sink 24 and the hand insertion section 16. The second sensor 32 comprises a second sensor head 33 on the inner wall of the hand treatment chamber 12. The second sensor 32 may for instance be a motion sensor, an infrared sensor, a radio-frequency sensor, an optical sensor or any other motion sensor. The second sensor 32 is adapted for detecting a presence of the user's 18 hands 20 in the sink 22 of the hand treatment chamber 12, wherein the second sensor head 33 can provide a signal when the user's 18 hands 20 are present in the sink 22.

Close to the safety device 26, a third sensor 34 is arranged in the inner wall of the hand treatment chamber, wherein the third sensor comprises a third sensor head 35 arranged on the inner wall. The third sensor 34 is adapted for detecting whether the sink 22 and/or the outflow sink 24 is e.g. filled with water. In other words, the third sensor 34 can be a sink full sensor.

All sensors can be multiply present on the hand treatment device 10 for redundancy and safety reasons.

The hand treatment device 10 further comprises a fluid supply device 36, which comprises a fluid supply valve 37 and an interface 38 for fluid supply. The fluid supply device is adapted for providing water and/or disinfectant. Apart from that, also other fluids or liquids, such as e.g. a soap, a cleaning agent, or a purifier can be supplied into the hand insertion section 16 by the fluid supply device 36. Also an oil, a cream, or any other cosmetic care product may be supplied. The fluid supply device 36 further comprises a spray device 40, wherein the spray device 40 can be connected by a line 41 to the fluid supply valve 37 and it can be arranged on two sides of the center plane 21 on the inner wall of the hand insertion section 16. The spray device 40 can e.g. be a nozzle, a nozzle arrangement, an injector, a bushing, or a perforated hose. The spray device 40 can amongst others be adapted for supplying water and/or disinfectant into the hand insertion section 16, such that the user's 18 hands 20 and/or the hand treatment chamber 12 are cleaned and/or disinfected.

The hand treatment device 10 further comprises a control device 42, which is connected by electrical lines 43, 44, 45, 46 to the fluid supply device 36, the first sensor 28, the second sensor 32 and the third sensor 34, respectively. The control device 42 is adapted for controlling and/or regulating the hand treatment device 10. The control device 42 further comprises an interface 47 for a power supply of the hand treatment device 10. Moreover, the control device 42 comprises an interface 48 for a data exchange e.g. to a cabin information data system of an aircraft or any other external system. Via the interface 48 all relevant data information for equipment control, monitoring and activation of the hand treatment device 10 can be provided.

The hand treatment device 10 further comprises an airflow generating device 50, which is connected to the outflow sink 24 by a check valve and/or stench trap 51. The stench trap 51 can for instance comprise or be a membrane or a spring-loaded flap.

The airflow generating device 50 further comprises a valve 52, which can be a purge valve or flush valve, and which is connected by an electrical line 53 to the control device 42. Apart from that, the airflow generating device 50 comprises a pressure sensor 54, which is connected by an electrical line 55 to the control device 42, a manual shut-off valve 56 and an interface 59 to a source of negative pressure 60, such as e.g. a vacuum toilet system of an aircraft or an outside environment of the aircraft.

The valve 52 can only open a path to the source of negative pressure 60 if the pressure sensor 54 detects a required difference pressure to the environment of the hand treatment device 10, such as e.g. a cabin air pressure. Moreover, the check valve and/or stench trap 51 can only open in direction of the source of negative pressure 60.

The hand treatment device further comprises a bypass device 62 comprising an interface 63 to an environment of the hand treatment device 10, a control valve 64 and a bypass tube 66, which is connected to the outflow sink 24.

When the user 18 inserts his hands 20 into the hand insertion section 16, the presence of the hands 20 is detected by the first sensor 28, which in turn may provide a signal to the control device 42. In response or accordance to the signal from the first sensor 28, the valve 52 of the airflow generating device 50 is opened and a negative pressure is applied to the outflow sink 24 using the source of negative pressure 60.

The negative pressure in turn generates an airflow 58, such that air is sucked from an environment of the hand treatment device 10 through the hand insertion section 16 and the sink 22 into the outflow sink 24. Thereby any water which may be present on the user's 18 hands 20 may be dragged from the hands 20, carried through the hand treatment chamber 12 and purged or sucked into the outflow sink 24 and conducted through the valves 52 and 56.

Figure 2:
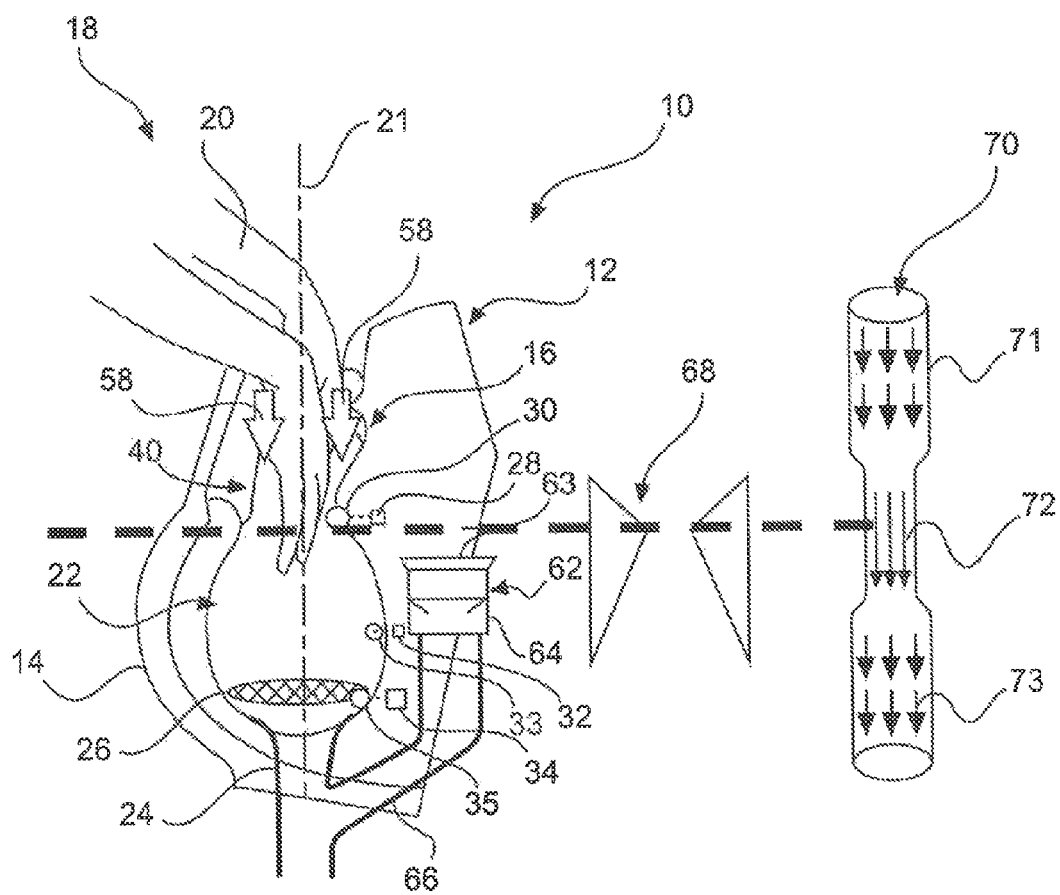
FIG. 2 schematically shows a cross-sectional view of a part of the hand treatment device of FIG. 1 and illustrates the basic principle of the hand treatment device.

FIG. 2 schematically shows a cross-sectional view of a part of the hand treatment device 10 of FIG. 1 and illustrates the basic principle of the hand treatment device 10.

Next to the hand treatment chamber 12 a rough shape of a cross section 68 through the hand insertion section 16 is illustrated. The cross section 68 is abstracted in the tube-shaped element 70 in order to illustrate the basic underlying principle of hand drying applied in the hand treatment device 10.

When the user 18 inserts his hands 20 into the hand insertion section 16 and the negative pressure is applied to the outflow sink 24, ambient air is sucked from the environment of the hand treatment device into the hand treatment chamber 12 and the airflow 58 is generated. The environment of the hand treatment device is illustrated by a first section 71 in the tube-shaped element 70 having a large cross sectional area. When the airflow enters the hand insertion section 16, it has to pass a "bottleneck-like" constriction in the hand insertion section 16. This constriction is illustrated by the section 72 in the tube-shaped element 70 having a small cross sectional area. Due to the constriction, a velocity of the airflow 58 is increased and its pressure is decreased. This is commonly known as the "Venturi effect", which may be considered a jet effect. In the sink 22 the cross sectional area again increases and the velocity of the streaming air decreases. This is illustrated by the section 73 in the tube-shaped element 70.

As a result of the prescribed jet effect, the airflow 58 reaches a maximum velocity in the hand insertion section 16. As a result, water on the user's 18 hands 20 can be dragged from the hands 20 and carried by the airflow 58. Thus, the airflow 58 can effectively dry the user's 18 hands 20.

Figure 3:
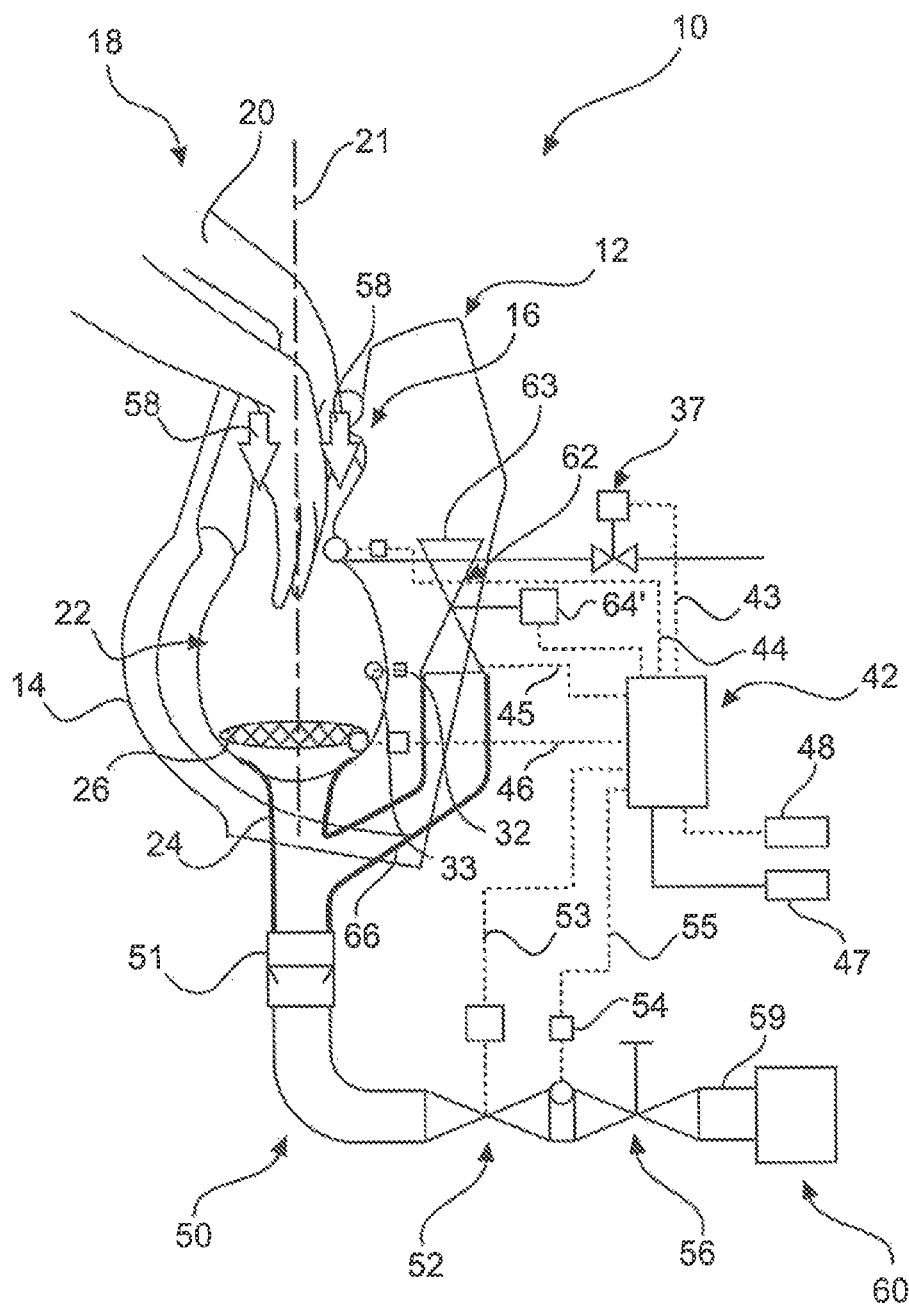
FIG. 3 schematically shows a cross-sectional view of a hand treatment device according to an embodiment of the present disclosure.

FIG. 3 schematically shows a cross-sectional view of a hand treatment device 10. If not stated otherwise, the hand treatment device 10 of FIG. 3 may comprise the same components as the one of in FIG. 1. FIG. 3 aims on illustrating a user protection system of the hand treatment device 10 for protecting the user 18 against suction effects.

As described in FIG. 1, the hand treatment device comprises a bypass device 62 with an interface 63 to the environment of the hand treatment device 10 and a bypass tube 66, which is connected to the outflow sink 24.

In FIG. 3 the bypass device 62 comprises a control valve 64', which is connected to the control device 42. The control valve 64' may be a mechanic, e.g. a spring-loaded flap or an electro-mechanic valve.

The control valve 64' may provide a further supply path to ambient air in the environment of the hand treatment device 10 and is able to bypass the sink 22 of the hand treatment chamber 12.

When the user 18 inserts his hands 20 into the sink 22 and reaches the second sensor 32, the airflow 58 can be stopped and/or bypassed by opening control valve 64' and providing the further supply path to ambient air in the environment of the hand treatment device 10.

Apart from that, the control valve 64' can serve to control and/or regulate a flow speed of the airflow 58 and/or a flow pressure.

Moreover, a presence of the user's 18 hands 20 in the sink 22 detected by the second sensor 32 can automatically activate (via the control device 42) the valve 52 to close or reduce a path to the source of negative pressure 60.

In general, in order to protect the user 18 against suction effects, different sensor systems for the first and/or second sensors 28, 32 may be conceivable to detect the user 18 and control the airflow 58 by opening, closing, regulating and/or controlling the corresponding valves 64, 64', 52 via the control device 42.

Figure 4:
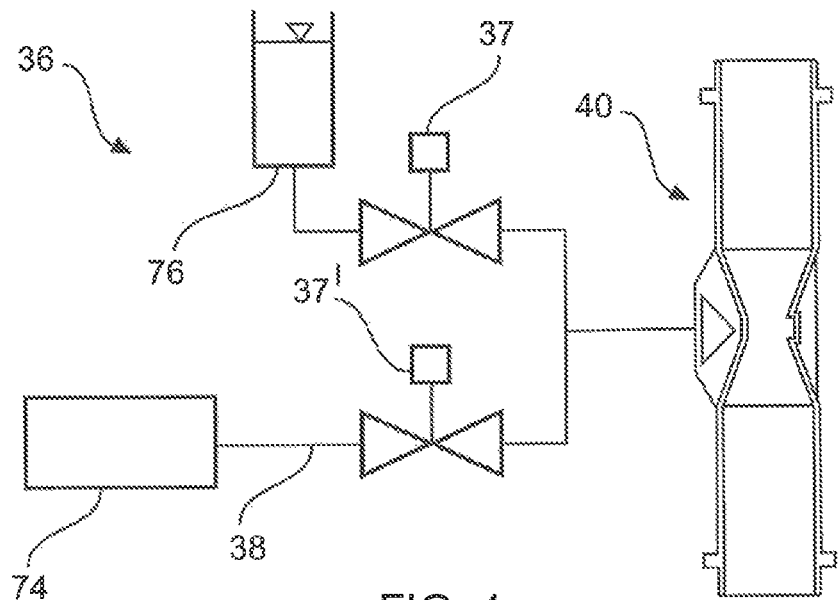
FIG. 4 schematically illustrates a fluid supply device for a hand treatment device according to an embodiment of the present disclosure.

FIG. 4 schematically illustrates the fluid supply device 36 of the hand treatment device 10 of FIG. 1 or 3.

The fluid supply device 36 comprises a spray device 40 arranged on an inner wall of the insertion section 16 and an interface 38 for a fluid supply 74, which spray device 40 is adapted to provide, supply and/or inject water and/or disinfectant and/or other fluids, such as e.g. soap, cleaning agent, purifier, oil, or cream, into the hand insertion section 16. The fluid supply 74 can be a supply of water and it may be connected with a fluid supply valve 37' to the spray device 40. The fluid supply device 36 may further comprise a fluid storage device 76, which can serve to store disinfectant or other liquids, such as e.g. soap, cleaning agent, purifier, oil, or cream. The fluid storage device 76 is connected to the spray device 40 by the fluid supply valve 37.

When the user 18 inserts his hands 20 into the hand insertion section 16, the fluid supply valves 37, 37' can be activated and water and/or disinfectant or any other fluid or liquid may be injected into the hand insertion section 16 via the spray device 40. This may in general provide a cleaning procedure for the sink 22 prior and/or during purging the airflow 58. Apart from that, it may provide a supply with agent for the hand treatment chamber 12 or any other equipment and/or the user's hand disinfection.

Figure 5:
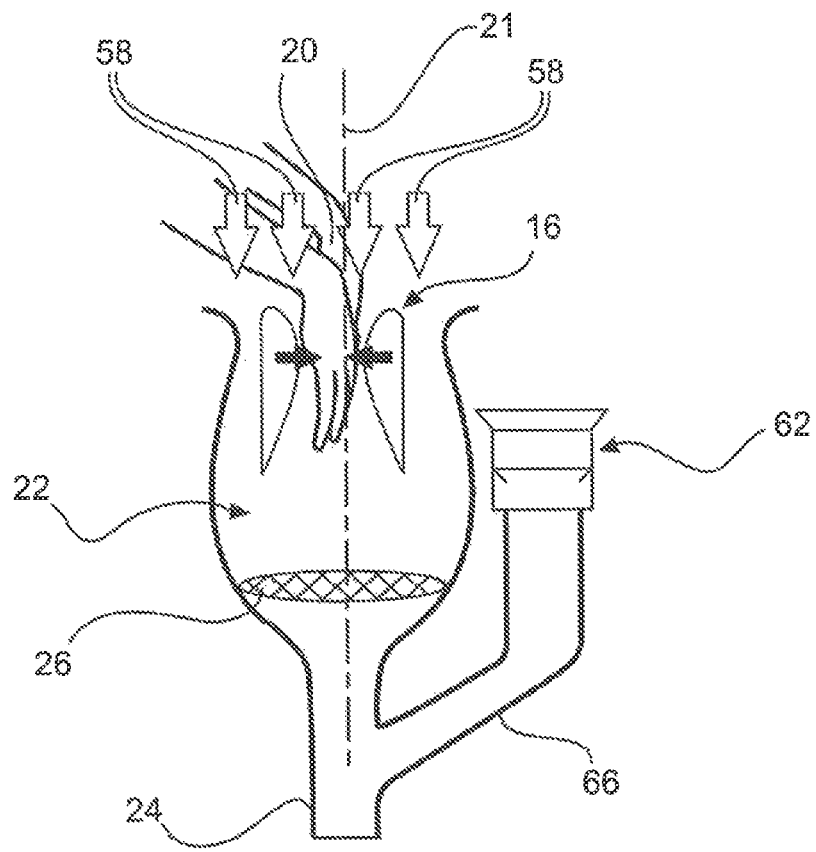
FIG. 5 schematically shows a cross-sectional view through a part of a hand treatment device according to an embodiment of the present disclosure.

FIG. 5 schematically shows a cross-sectional view through a part of a hand treatment device 10. If not stated otherwise, the hand treatment device 10 may comprise the same components as the hand treatment device 10 of FIG. 1 or 3. FIG. 5 aims on illustrating a hand guidance effect of the hand treatment device 10.

As illustrated in FIG. 5, the hand insertion section may be blade-like or wing-like shaped in cross section. When the user's 18 hands 20 are inserted in the hand insertion section 16 and the airflow 58 is generated, the airflow 58 streams along the blade-like or wing-like profile of the hand insertion section. This may lead to a guidance effect for the hands 20 as the hands 20 are symmetrically guided and/or pushed towards the center plane 21 of the hand treatment chamber 12 due to the constriction provided by the hand insertion section 16.

Figure 6:
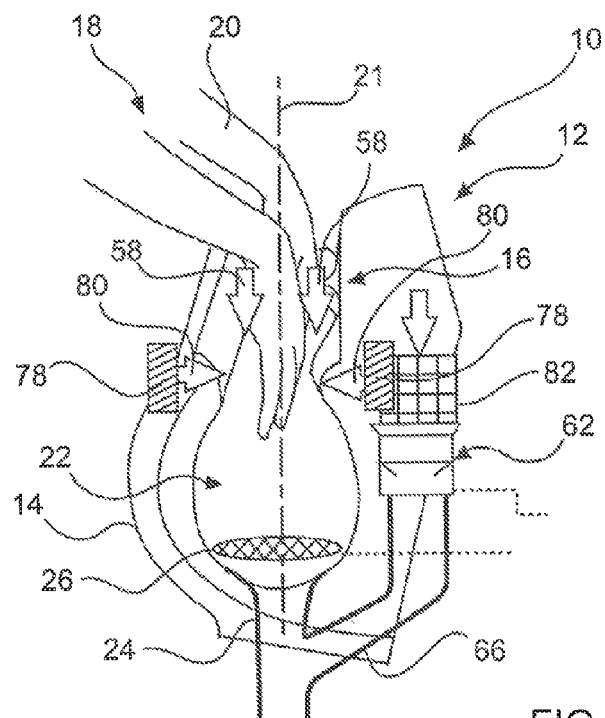
FIG. 6 schematically shows a further cross-sectional view through a part of a hand treatment device according to an embodiment of the present disclosure.

FIG. 6 schematically shows a further cross-sectional view through a part of a hand treatment device 10. If not stated otherwise, the hand treatment device 10 may comprise the same components as the hand treatment device 10 of FIG. 1 or 3.

The hand treatment device 10 may further comprise air inlet openings 78 symmetrically arranged on both sides of the center plane 21 on the inner wall of the hand insertion section 16. The air inlet openings may for instance be louvers.

Once the airflow 58 is generated, further airflows 80 can be generated streaming laterally to the airflow 58 into the hand treatment chamber 12. By these further airflows 80, the hands 20 are symmetrically guided and/or pushed towards the center plane 21. This may increase a hygiene of the hand treatment device 10 since the user's 18 hands 20 are prevented to touch the inner wall of the hand insertion section 16.

The air inlet openings 78 may additionally comprise air filters to clean air purged through them.

In FIG. 6 also a muffler system 82 is shown which is arranged on interface 63 to the environment of the hand treatment device 10 of the bypass device 62. The muffler system 82 may for instance serve to reduce a purging noise of the hand treatment device 10. Such muffler system 82 may also be arranged on the air inlet openings 78.

Figure 7:
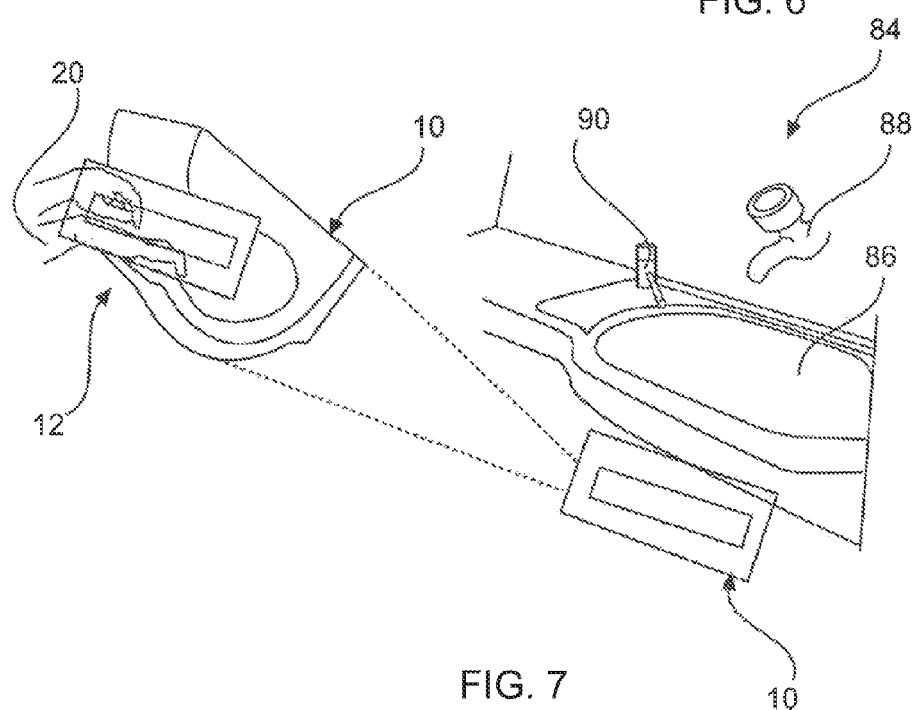
FIG. 7 schematically shows a washstand for an aircraft according to an embodiment of the present disclosure.

FIG. 7 schematically shows a washstand 84 for an aircraft with a hand treatment device 10, which may comprise the same components as the hand treatment devices 10 of FIG. 1 or 3.

The washstand 84 comprises a washbasin 86, a faucet 88, a soap dispenser 90 and the hand treatment device 10 mounted below the washbasin 86. An installation of the hand treatment device 10 close to, such as below, the washbasin 86 may meet and fulfil requirements in terms of ergonomics, hygiene, and maintenance.

Figure 8:
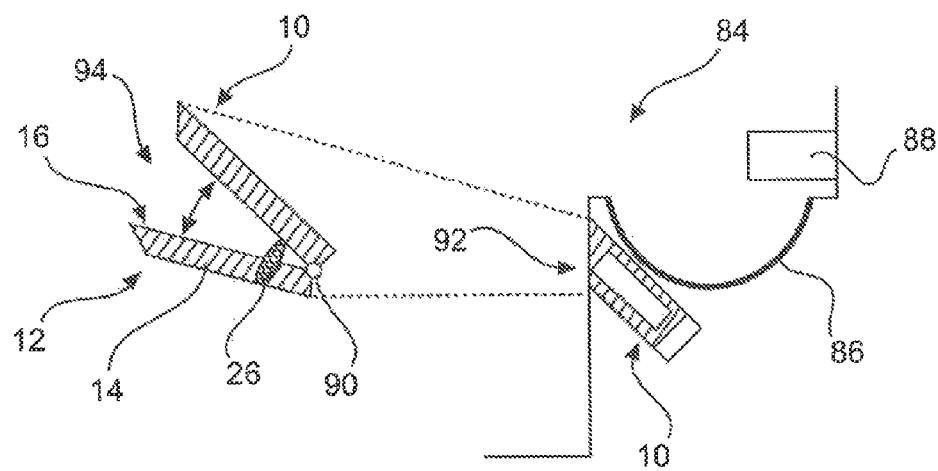
FIG. 8 schematically shows a cross sectional view of the washstand of FIG. 7.

FIG. 8 schematically shows a cross sectional view of the washstand 84 of FIG. 7.

The hand treatment device 10 is pivotably mounted with a hinge 90 below the washbasin 86 for being pivoted from a storage position 92 into a use position 94. The use position 94 may also serve for maintenance of the hand treatment device 10.

The hand treatment device 10 may be adapted for automatically pivoting from the storage position 92 into the use position 94, when a water supply of the washbasin 86 is activated.

Figure 9:
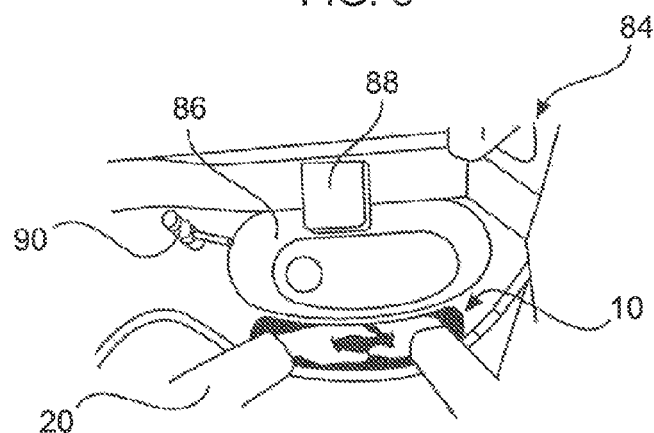
FIG. 9 schematically shows a perspective view of a washstand according to another embodiment of the present disclosure.

FIG. 9 schematically shows a perspective view of a washstand 84 according to one embodiment of the present disclosure. If not stated otherwise, the washstand 84 may comprise the same components as the washstand 84 of FIG. 7.

In contrast to FIG. 7 the hand treatment device 10 is mounted in front of the washbasin 86. Accordingly the hand treatment device can easily be reached by the user 18 while standing in front of the washbasin 86.

The entire washstand 84 may be configured for a contactless usage. This may mean the faucet 88 may be activated by some kind of sensor arranged at the washbasin 86, for instance in a floor in front of the washstand 84. When the faucet is deactivated or a water supply to the faucet is stopped, the hand treatment device 10 may automatically be activated to indicate the user 18 to dry his hands 18.

Figure 10:
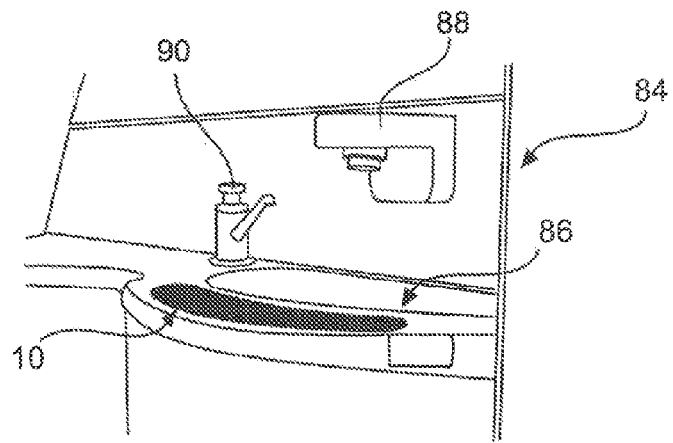
FIG. 10 schematically shows another perspective view of the washstand of FIG. 9.

FIG. 10 schematically shows another perspective view of the washstand 84 of FIG. 9. If not stated otherwise, the washstand 84 may comprise the same components as the washstand 84 of FIG. 7.

Figure 11:
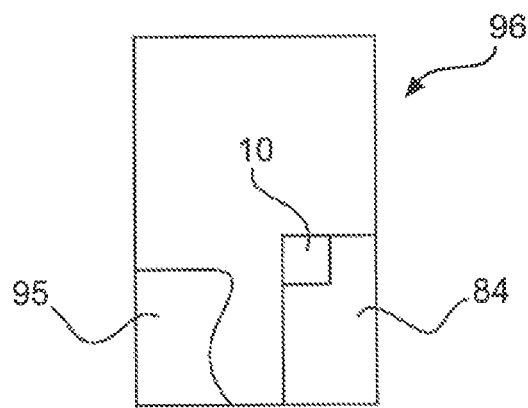
FIG. 11 schematically shows a lavatory module of an aircraft according to an embodiment of the present disclosure.

FIG. 11 schematically shows a lavatory module 96 of an aircraft.

The lavatory module 96 comprises a toilet bowl 98 and a washstand 84. The washstand 84 comprises a washbasin 86 and a hand treatment device 10.

Figure 12:
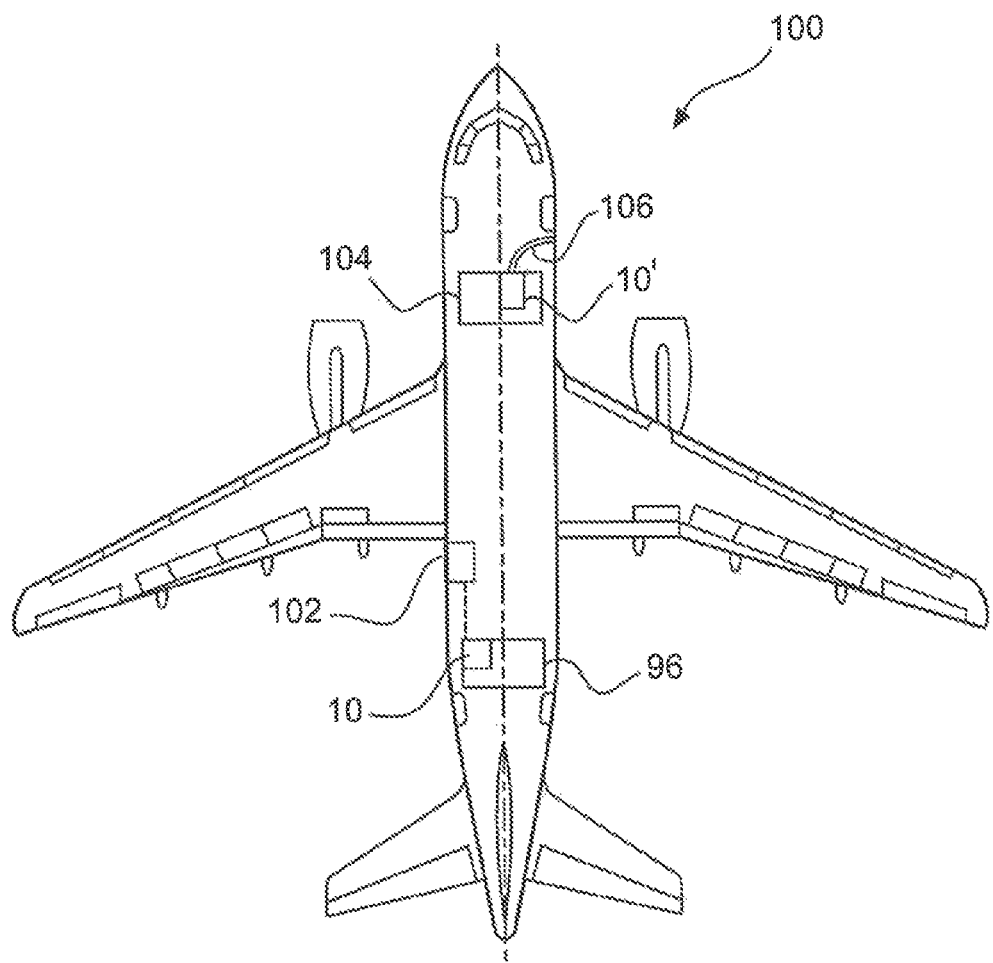
FIG. 12 schematically shows an aircraft with a lavatory module according to an embodiment of the present disclosure.

FIG. 12 schematically shows an aircraft 100 with a lavatory module 96.

The lavatory module comprises a hand treatment device 10 which is connected to a vacuum toilet system 102 of the aircraft 100. The vacuum toilet system 102 serves as a source of negative pressure for operating the hand treatment device 10.

The aircraft 100 comprises a further hand treatment device 10' which is mounted in a galley 104 of the aircraft

100. The hand treatment device 10' is connected by a low-pressure line 106 to an outside environment of the aircraft 100, wherein the outside environment serves as a source of negative pressure for operating the hand treatment device 10'.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A hand treatment device for drying a user's hands with an airflow, the hand treatment device comprising:
    a hand treatment chamber comprising a hand insertion section and an outflow sink for purging fluid carried by the airflow from the user's hands to the outflow sink, wherein the airflow is generated by applying a negative pressure to the outflow sink, such that air is sucked from an environment of the hand treatment device through the hand insertion section into the outflow sink;
    wherein a source of the negative pressure is a vacuum toilet system of the aircraft or an outside environment of the aircraft.

2. The hand treatment device according to claim 1, further comprising:
    a first sensor for detecting a presence of the user's hands in the hand insertion section; and
    a second sensor for detecting a presence of the user's hands in the hand treatment chamber,
    wherein the airflow is generated in accordance with a signal of the first sensor and the airflow through the hand insertion section is stopped in accordance with a signal of the second sensor.

3. The hand treatment device according to claim 1, further comprising:
    a fluid supply device adapted for providing at least one of water and a disinfectant,
    wherein the fluid supply device comprises a spray device, which is adapted for supplying the at least one of the water and the disinfectant into the hand insertion section, such that at least one of the user's hands and the hand treatment chamber are at least one of cleaned and disinfected.

4. The hand treatment device according to claim 1,
    wherein at least one air inlet opening is arranged on an inner wall of the hand treatment chamber, which at least one air inlet opening is adapted for providing at least one further airflow, such that the user's hands are pushed by the at least one further airflow towards a center plane of the hand treatment chamber.

5. A washstand, comprising:
    a washbasin; and
    a hand treatment device for drying a user's hands with an airflow, the hand treatment device including a hand treatment chamber having a hand insertion section and an outflow sink for purging fluid carried by the airflow from the user's hands to the outflow sink,
    wherein the airflow is generated by applying a negative pressure to the outflow sink, such that air is sucked from an environment of the hand treatment device through the hand insertion section into the outflow sink.

6. The washstand according to claim 5,
    wherein the hand treatment device is arranged at a front side of the washbasin or below the washbasin.

7. The washstand according to claim 5,
    wherein the hand treatment device is pivotably mounted for being pivoted from a storage position into a use position; and
    wherein the hand treatment device is adapted for automatically pivoting from the storage position into the use position, when a water supply of the washbasin is activated.

8. The washstand according to claim 5,
    wherein the washstand is configured for a contactless usage.

9. A lavatory module for a means of transport, comprising:
    a hand treatment device for drying a user's hands with an airflow, the hand treatment device comprising:
        a hand treatment chamber comprising a hand insertion section and an outflow sink for purging fluid carried by the airflow from the user's hands to the outflow sink; and
        a fluid supply device adapted for providing at least one of water and a disinfectant,
    wherein the airflow is generated by applying a negative pressure to the outflow sink, such that air is sucked from an environment of the hand treatment device through the hand insertion section into the outflow sink; and
    wherein a source of the negative pressure is a vacuum toilet system of the aircraft or an outside environment of the aircraft.

10. An aircraft, comprising:
    a hand treatment device for drying a user's hands with an airflow, the hand treatment device including a hand treatment chamber having a hand insertion section and an outflow sink for purging fluid carried by the airflow from the user's hands to the outflow sink, the hand treatment device including a first sensor for detecting a presence of the user's hands in the hand insertion section;
    wherein the airflow is generated by applying a negative pressure to the outflow sink, such that air is sucked from an environment of the hand treatment device through the hand insertion section into the outflow sink and the airflow is generated in accordance with a signal of the first sensor; and
    wherein a source of the negative pressure is a vacuum toilet system of the aircraft or an outside environment of the aircraft.

11. The aircraft according to claim 10, further comprising:
    an airflow generating device comprising a valve, which is adapted for connecting the source of negative pressure to the outflow sink;
    wherein the airflow generating device is adapted for generating the airflow to dry the user's hands; and
    wherein the negative pressure is applied by opening the valve, such that air is sucked from the environment of the hand treatment device through the hand insertion section into the outflow sink.

12. The aircraft according to claim 10,
wherein the hand treatment device is connected to a toilet assembly of the aircraft and a flush of the toilet assembly is activated when the hand treatment device is activated.

13. The aircraft according to claim 10, further comprising a washbasin, wherein the hand treatment device is arranged at a front side of the washbasin or below the washbasin.

14. The aircraft according to claim 13,
wherein the hand treatment device is pivotably mounted for being pivoted from a storage position into a use position; and
wherein the hand treatment device is adapted for automatically pivoting from the storage position into the use position, when a water supply of the washbasin is activated.

15. The aircraft according to claim 10, wherein the hand treatment device further comprises:
a fluid supply device adapted for providing at least one of water and a disinfectant,
wherein the fluid supply device comprises a spray device, which is adapted for supplying the at least one of the water and the disinfectant into the hand insertion section, such that at least one of the user's hands and the hand treatment chamber are at least one of cleaned and disinfected.

16. The aircraft according to claim 10, wherein at least one air inlet opening is arranged on an inner wall of the hand treatment chamber, which at least one air inlet opening is adapted for providing at least one further airflow, such that the user's hands are pushed by the at least one further airflow towards a center plane of the hand treatment chamber.

17. The aircraft according to claim 10, wherein the hand treatment device further comprises:
a second sensor for detecting a presence of the user's hands in the hand treatment chamber,
wherein the airflow through the hand insertion section is stopped in accordance with a signal of the second sensor.

* * * * *